United States Patent [19]

DeMario et al.

[11] Patent Number: 5,265,138
[45] Date of Patent: Nov. 23, 1993

[54] SPRING/DIMPLE INSTRUMENT TUBE RESTRAINT

[75] Inventors: Edmund E. DeMario; Charles N. Lawson, both of Columbia, S.C.

[73] Assignee: Westinghouse Electric Corp., Pittsburgh, Pa.

[21] Appl. No.: 903,049

[22] Filed: Jun. 23, 1992

[51] Int. Cl.⁵ .............................................. G21C 3/32
[52] U.S. Cl. .................................. 376/434; 376/254
[58] Field of Search .............. 376/254, 446, 449, 434, 376/463

[56] References Cited

U.S. PATENT DOCUMENTS

| | | | |
|---|---|---|---|
| 4,751,039 | 6/1988 | Delevallee et al. | 376/254 |
| 4,933,137 | 6/1990 | Murakami et al. | 376/254 |
| 4,990,304 | 2/1991 | Rylatt | 376/254 |

Primary Examiner—Daniel D. Wasil

[57] ABSTRACT

A nuclear fuel assembly for a pressurized water nuclear reactor has a spring and dimple structure formed in a non-radioactive insert tube placed in the top of a sensor receiving instrumentation tube thimble disposed in the fuel assembly and attached at a top nozzle, a bottom nozzle, and intermediate grids. The instrumentation tube thimble is open at the top, where the sensor or its connection extends through the cooling water for coupling to a sensor signal processor. The spring and dimple insert tube is mounted within the instrumentation tube thimble and extends downwardly adjacent the top. The springs and dimples restrain the sensor and its connections against lateral displacement causing impact with the instrumentation tube thimble due to the strong axial flow of cooling water. The instrumentation tube has a stainless steel outer sleeve and a zirconium alloy inner sleeve below the insert tube adjacent the top. The insert tube is relatively non-radioactivated inconel alloy. The opposed springs and dimples are formed on diametrically opposite inner walls of the insert tube, the springs being formed as spaced axial cuts in the insert tube, with a web of the insert tube between the cuts bowed radially inwardly for forming the spring, and the dimples being formed as radially inward protrusions opposed to the springs.

18 Claims, 5 Drawing Sheets

SPRING/DIMPLE INSTRUMENT TUBE RESTRAINT

GOVERNMENT CONTRACT

The Government of the United States of America has rights in this invention pursuant to Contract No. DE-AC03-90SF18495 awarded by the Department of Energy.

BACKGROUND OF THE INVENTION

1. Field of the Invention

The invention relates to the field of mountings for instruments used to sense conditions in the fuel assemblies of nuclear reactors such as pressurized water reactors, wherein the instruments and/or tubes holding the instruments must extend upwardly from the fuel assemblies, where there is a strong axially upward flow of water heated by the fuel rods. An insert for the thimble tube receiving the instrument tube has opposed bow springs and dimples protruding radially inwardly, for steadying the top of the instrument tube.

2. Description of the Prior Art

Nuclear reactors of the type used to generate power by producing heat in fissile material generally have reactor cores comprising numerous fuel rods arranged in closely spaced arrays. The fuel rods are carried in supporting skeletons which can be handled as units. The skeletons have a top plate and a bottom plate known as nozzles, and a number of intermediate plates known as grids. The grids have openings through which the fuel rods extend and are held vertical and parallel to one another in a laterally spaced array, being relatively rigidly held in place by spring formations on the grids. Nuclear flux passing between the fuel rods heats the fuel rods, and water or other coolant is circulated over the fuel rods to extract heat for useful generation of power. Heating of the water along the surfaces of the fuel rods produces a convection current moving the water vertically upwardly. The water passing over the top of the fuel rods in a strong axial current.

The top and bottom nozzles and the intermediate grids of the fuel assemblies are fixed relative to one another by thimble tubes attached respectively to the grids and nozzles, forming a structural unit for supporting a number of the fuel rods, for example about 300. The thimble tubes include control rod guide thimbles for passage of control rods which when lowered absorb nuclear flux to reduce the overall rate of fission, or when raised allow the flux to pass between fuel rods to increase the rate of fission.

Preferably, one of the thimbles for each fuel assembly is reserved for instrumentation which senses the operation of the reactor in the area of the fuel assembly. The instrumentation is in turn carried in a sensor tube which can be lowered into one of the thimbles for monitoring, or raised from its thimble for service. The thimbles for the control rods and for the instrumentation are located among the fuel rods. Typically, the instrumentation tube thimble is located centrally in the array of fuel rods, and the control rod guide thimbles are interspersed among the fuel rods in a pattern.

In order to achieve efficient fuel burn rates and assure safe operation, continuous monitoring of each fuel assembly within a reactor core is important. Proper monitoring is accomplished through the use of instrumentation probes. The probe apparatus includes the sensor or instrumentation tube holding the sensors, i.e., a stationary housing which extends the length of the fuel assembly, and an electronic sensor arrangement. The sensor arrangement can have one or more sensors on preferably well-protected cables, lowered into the housing and electrically coupled to signal processing apparatus. Preferably, the sensor arrangement is carried in an instrumentation tube which is lowered into the sensor thimble tube. A number of instrumentation tubes can be inserted into selected thimble tubes, including the central tube and/or others of the thimble tubes which otherwise would hold a control rod. The instrumentation tube normally is arranged to be withdrawn. Electrical conductors for conveying the sensor signals from the sensors in the instrumentation tube extend upwardly within an extension of the instrumentation tube, to appropriate remote electronics operable to decode useful information from the sensor signals. Although the top nozzle of the fuel assembly provides some protection, there is an unshielded expansion gap over an axial distance above the top of the sensor thimble, where the instrumentation tube, or perhaps the external shielding of a cable or the like leading to the sensors in the thimble, protrudes above the sensor thimble tube.

During reactor operation, cooling water enters from the bottom of the reactor and flows upward, through the fuel assembly. Some of this water may flow along the annular space between the inner wall of the sensor thimble tube and the outer wall of the sensor probe housing (or instrumentation tube). A substantial axial flow of water exists around the fuel rods and the thimbles. The high velocity turbulent water flowing around the fuel rods thimbles, and in particular the axial gap at the top of the sensor thimble, subjects the top of the instrumentation tube to substantial lateral vibration, resulting in hydraulically induced fretting as the instrumentation tube (and/or any other structure provided to protect the instrumentation tube and its conductors at the top of the thimble), vibrates laterally and impacts against the inner walls of the instrumentation thimble.

Such a condition tends to shorten the service life of the instrumentation tube as well as the instrumentation thimble. The prior art solution to the problem has been to build these parts of materials which are sufficiently durable to withstand the vibrations which are produced by the unavoidable axial flow of cooling water.

The known instrumentation thimble comprises a stainless steel outer tube and a zirconium alloy inner tube coaxial with the outer tube. The zirconium and stainless steel tubes are axially locked relative to one another by forming a series of annular bulges in the two, e.g., by sliding the tubes over one another and rolling the inner tube using radially outward pressure to form annular interlocking ridges. This stainless steel reinforcement of the instrumentation thimble is provided at the top of the instrumentation thimble, extending downwardly in the direction of an uppermost one of the grids.

The instrument tube housing the sensors can also be made using stainless steel. Stainless steel provides sufficient strength and hardness to withstand the vibration-induced impacts which occur at the top of the instrumentation thimble. Unfortunately, stainless steel of an appropriate composition to withstand the necessary stress and impacts normally contains cobalt. The cobalt in the stainless steel is activated by irradiation in the nuclear flux of the reactor. When the instrument tube is removed from its thimble for service, such as testing and calibration, nuclear decay of the cobalt or its by-products in the stainless steel produces unwanted radiation that can be dangerous.

It would be advantageous to provide some means to render the instrument tube and the thimble more durable for surviving impacts, without relying on a material which results in the tube or thimble becoming radioactive after use. It would also be advantageous to reduce the vibration occurring at the top of the fuel assembly due to the axial rush of water, even though it is necessary to reactor operation that this rush of water be facilitated.

SUMMARY OF THE INVENTION

It is an object of the invention to provide a substantially non-activatable material for protection of the top of an instrumentation thimble and the instrument housing to be placed therein, while maintaining a long service life as typical of durable stainless steel materials.

It is also an object of the invention to reduce impacts due to vibration at the top of an instrumentation thimble by providing a resilient spacing structure which is easily formed on an inside of the thimble.

These and other objects are accomplished by a nuclear fuel assembly for a pressurized water nuclear reactor having a spring and dimple structure formed in a non-radioactive insert tube placed in the top of a sensor receiving instrumentation tube thimble disposed in the fuel assembly and attached at a top nozzle, a bottom nozzle, and intermediate grids. The instrumentation tube thimble is open at the top, where the sensor or its connection extends through the cooling water for coupling to a sensor signal processor. The spring and dimple insert tube is mounted within the instrumentation tube thimble and extends downwardly adjacent the top. The springs and dimples restrain the sensor and its connections against lateral displacement causing impact with the instrumentation tube thimble due to the strong axial flow of cooling water. The instrumentation tube thimble has a stainless steel outer sleeve and a zirconium alloy inner sleeve below the insert tube adjacent the top. The insert tube comprises inconel alloy, which has the advantageous property of retaining good spring characteristics after irradiation. The opposed springs and dimples are formed on diametrically opposite inner walls of the insert tube, the springs being formed as spaced axial cuts in the insert tube, with a web of the insert tube between the cuts bowed radially inwardly for forming a spring, and the dimples being formed as radially inward protrusions opposed to the springs.

BRIEF DESCRIPTION OF THE DRAWINGS

The invention is disclosed with reference to certain exemplary embodiments as shown in the appended drawings. It should be understood that the invention is not limited to the exemplary embodiments and is subject to variation in accordance with the description and the appended claims. In the drawings.

DETAILED DESCRIPTION OF THE PREFERRED EMBODIMENTS

Figure 1:
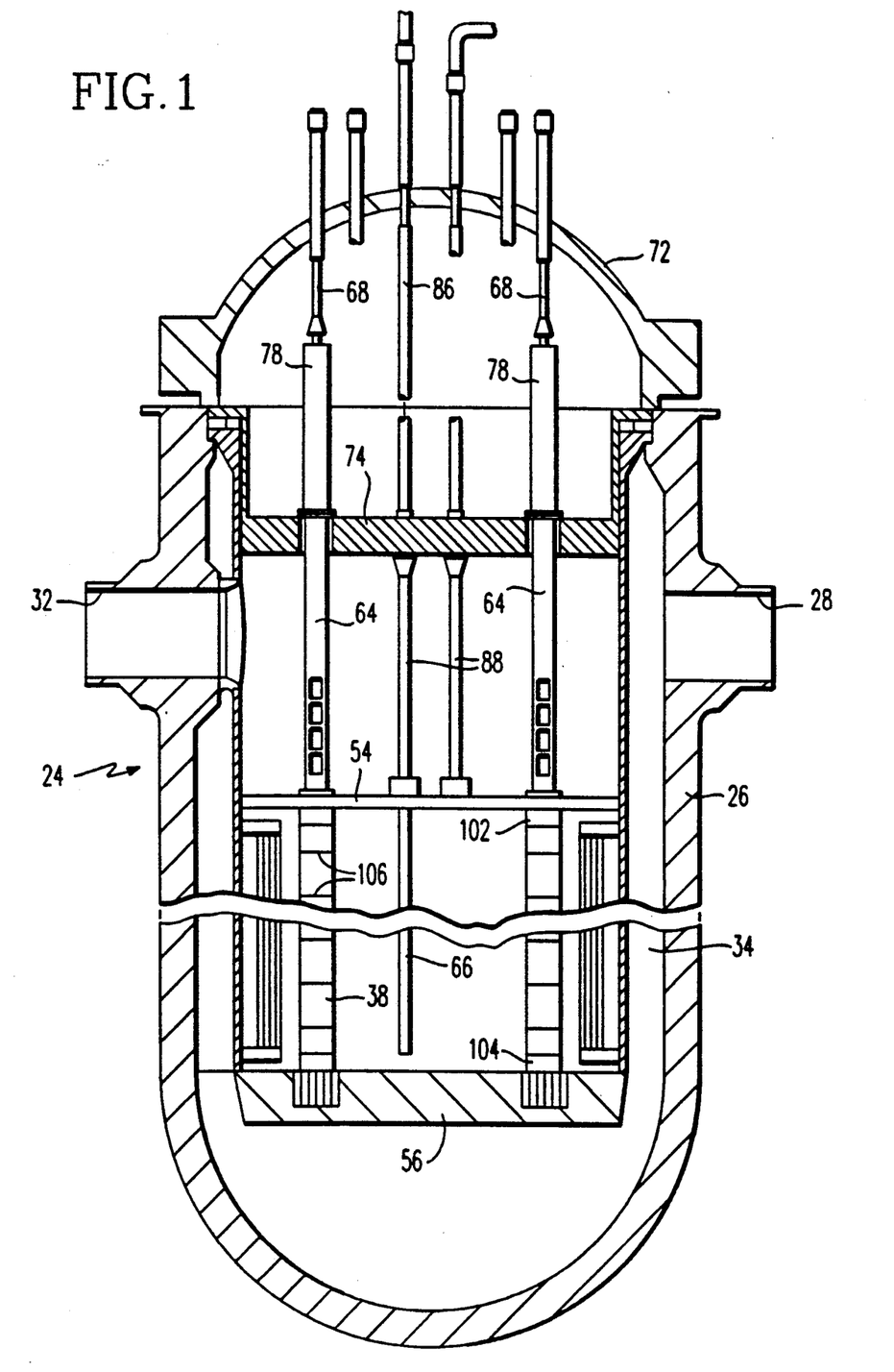
FIG. 1 is a simplified sectional illustration of a presurized water reactor vessel.

The reactor vessel portion of a pressurized water nuclear reactor is shown in FIG. 1. The reactor vessel 24 is typically coupled with electrical generators for extracting power from water heated in the reactor vessel, and a number of control means, cranes for accessing the contents of the reactor vessel and the like. Only the reactor vessel portion is shown in the drawings.

The reactor vessel 24 has an outer casing 26 traversed by one or more water inlet ports 28 and water outlet ports 32. Cooling water arriving at the inlet port(s) 28 is directed downwardly in an annular channel 34 between the inner walls of the outer casing 26 and a reactor barrel 36 which encloses the fuel assemblies 38 and is coupled near the top of the barrel 36 with the water outlet port 32. After cooling the outer casing 26 and the barrel 36, the water flows upwardly along the surfaces of elongated fuel rods 52, shown in detail in FIG. 2, carried in parallel vertical relationship in fuel assemblies 38. Convection heating of the water produces a strong axially upward flow, which is directed into the outlet port 32, and then to an electrical generator (not shown).

The fuel assemblies 38 are held between an upper core plate 54 and a lower core plate 56, typically by locating pins which engage between the upper core plate 54 and the individual fuel assemblies 38. Leaf springs 62 on the fuel assemblies 38 bear against the upper core plate 54 to keep the fuel assemblies 38 in stable position at the correct location for receiving control rods 64 and sensors in tubes 66 in guide tubes or "thimbles" in the fuel assemblies 38 provided therefor, aligned with corresponding openings in the upper core plate 54.

The fuel assemblies form 38 unitary structures for handling a group of fuel rods 52, and a large number of fuel assemblies 38 can be mounted in the reactor. In order to control the level of nuclear flux in the reactor vessel, and thereby control the heating of the water passing upwardly over the fuel rods 52, a plurality of control rods 64 are provided for each of the fuel assemblies 38. The control rods 64 are made of a material which absorbs neutrons and gamma radiation and are vertically movable via mechanical means 68 passing through seals in the bolted-on lid or closure head 72 of the reactor vessel 24. The control rods 64 can be lifted to a position between an upper support plate 74 and the upper core plate, where the control rods 64 reside in guide tubes 78 which are aligned with control rod receptacles or thimbles 82 in the fuel assemblies 38. When lowered into the receptacles or thimbles 82, which are interspersed among the fuel rods 52, the control rods 64 intersect the path of radiation that otherwise would pass between the fuel rods 52 and increase the rate of fission.

In addition to the control rod guides 78 and control rod thimble tubes 82, at least one sensor tube 92 for each fuel assembly 38 is also vertically movable into the area of the fuel rods 52 using a mechanical drive means 86 disposed above the closure head 72 of the vessel 24, extending downwardly through a guide tube 88. Each fuel assembly 38 may have a number of movable sensor housings or tubes 66 aligned with certain of the thimble tubes 92 in the fuel assemblies 38. The sensor tubes can have temperature sensors and sensors for detecting incident gamma and neutron radiation, and are useful for assessing the condition of the reaction as a whole as well as conditions which may occur locally at certain fuel assemblies. Preferably, each sensor tube 92 has a plurality of axially spaced radiation sensors and at least one temperature sensor such as a thermocouple, operable to detect the temperature of the exit water near the top of the fuel assemblies 38. These sensors are coupled by cables running through the sensor tubes 92 to signal processing apparatus which is remote from the reactor vessel 24.

Figure 2:
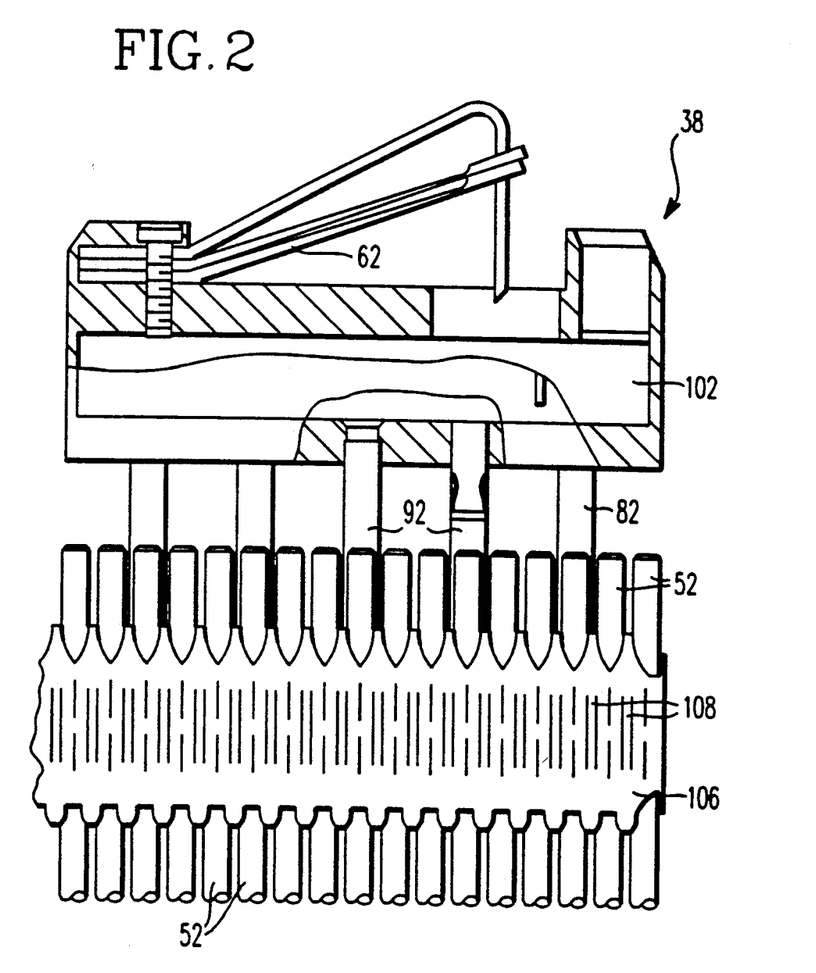
FIG. 2 is a cut away elevation view of a fuel assembly according to the invention.

In FIG. 1, only two fuel assemblies 38 are shown, and one sensor tube 66 is shown in its lowered position for monitoring a fuel assembly (not shown) disposed in the area between the two fuel assemblies 38 which are shown. FIG. 2 illustrates the upper portion of a typical fuel assembly 38, including the tops of the instrumentation tubes or thimbles 92 into which the sensor tubes 66 can be lowered.

Referring to FIGS. 1 and 2, each fuel assembly 38 has a top nozzle 102, a bottom nozzle 104, and a plurality of grid plates 106 disposed between them. The nozzles 102, 104 and grid plates 106 are rigidly fixed to the thimble tubes 82, 92 for receiving the control rods 64 and the instrumentation tubes 66, respectively. In this manner, each fuel assembly 38 forms a unit by which a group of fuel rods 52 can be handled. The fuel rods 52 are long, thin stacks of pellets of fissile material, enclosed in zirconium alloy tubes which are plugged at the ends. The fuel rods 52 extend generally between the top and bottom nozzles 102, 104, and are held in position by the grid plates 106, which are slotted and deformed to define inward facing spring bows 108 bearing radially inwardly on the fuel rods 52.

The fuel assemblies 38, and in particular the thimble tubes 82, 92 for the control rods and sensors, are aligned relative to the upper core plate 54 by pins (not shown) which protrude from the core plate 54 into locating holes in the top nozzles. The top nozzles 102 are generally open in the middle, allowing free passage of the control rods 64 and sensors tubes 66. Guide tubes 78, 88 attached to the top of the upper core plate 54 and the bottom of the upper support plate 74 protect the movable sensor tubes 66 in the area above the upper core plate 54. However, there is an unguarded area below the upper core plate 54 and above the attachment of the instrumentation tube thimble 92 to the top nozzle 102, where the sensor tube 66 (and/or its connecting structure) is exposed to the vertical flow of cooling water. This fast and turbulent flow along a line of elongation of the sensor tubes 66, laterally displaces and vibrates the sensor tubes 66 in their thimbles 92, causing intra-annular collisions between the sensor tube 66 and the thimble tube 92 in which it is received.

Figure 3:
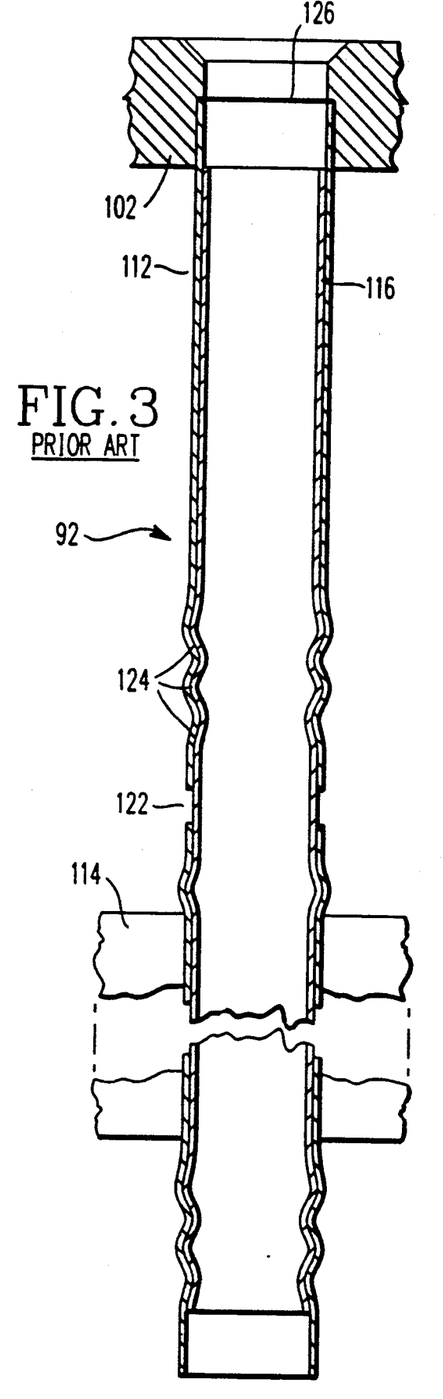
FIG. 3 is a partial section view showing an instrumentation tube thimble according to the prior art.

FIG. 3, which uses the same reference numerals to identify corresponding parts, shows a conventional mounting between an instrumentation thimble 92 and the top nozzle 102 of a fuel assembly. A stainless steel outer tube 112 is attached at a bore in the underside of the top nozzle 102, and extends substantially to the next adjacent grid plate 114, i.e., the uppermost one of the grid plates 106. A zirconium alloy tube 116 is attached along the inner walls of the stainless steel tube 112, extending substantially coextensively with the stainless steel tube 112, which is attached at the respective grid plate 114 and to the top nozzle 102. Gaps 122 in the stainless steel tube 112 can be provided to allow for expansion, and for passage of neutrons and gamma radiation, which passes through the zirconium alloy more readily than through the stainless steel. A plurality of complementary annular bends or bulges 124 are formed in both the inner (zirconium alloy) tube 116 and the outer (stainless steel) tube 112, so as to lock them together axially. Whereas there is no structure associated with this arrangement to limit lateral movement of a sensor or sensor tube inside the zirconium alloy inner tube, the sensor or sensor tube 66 impacts against the internal walls of the thimble tube 92 when subjected to the turbulent axial flow of water in the area above the top 126 of the thimble 92. To provide for a reasonable useful life, the conventional sensor tube or sensor is likewise encased in stainless steel.

Stainless steel of a strength and hardness needed for this application is typically provided with cobalt and other elements. A problem is encountered in that when a sensor or sensor tube 66 is provided with a stainless steel encasement, the cobalt or the like becomes radioactively activated by exposure to radiation adjacent the fuel assemblies 38. Therefore, although the sensor tube or housing is suitably strong and hard, when it becomes necessary to remove the sensor tube or housing, radiation is released outside of the reactor vessel, i.e., by the sensor or housing 66. Additionally, the radiation emitted from the casing of the sensor is detectable by the sensor, leading to an increase in the background count over time.

According to the invention, a softer material can be used to house the sensor, i.e., for the movable sensor tube 66 which holds the radiation and temperature sensors. This softer material can be of a type that is not activated by exposure to radiation, preferably zirconium alloy. Zirconium alloy is much less resistant to damage by impact against stainless steel than is stainless steel. However, according to the invention, the sensor tube 66 is supported positively in a manner which prevents intra-annular collisions which would deteriorate the sensor housing or tube 66, yet allows the sensor housing or tube to be withdrawn readily as necessary.

As shown in FIG. 3, the instrument tube mounting arrangement of the invention has a stainless steel outer tube 112 attached to the top nozzle 102 of the respective fuel assembly 38 and to the next adjacent grid plate 114 as before, with a zirconium alloy liner 116 fitted into the stainless steel outer tube 112 and joined by complementary annular bulges 124. According to the invention, however, the zirconium liner 116 does not extend to the top 126 of the thimble tube 92. Adjacent the top 126 of the instrumentation thimble 92, a short length 132 of inconel alloy tube is provided. Inconel is a steel and nickel alloy and although not as hard and strong as stainless steel, possesses good spring characteristics. More particularly, inconel has a low irradiation induced relaxation characteristic. Therefore, notwithstanding irradiation from the nuclear fuel over a period of time, the spring characteristics of the inconel inner tube 132 remain substantially constant over the useful life of the fuel assembly.

Figure 4:
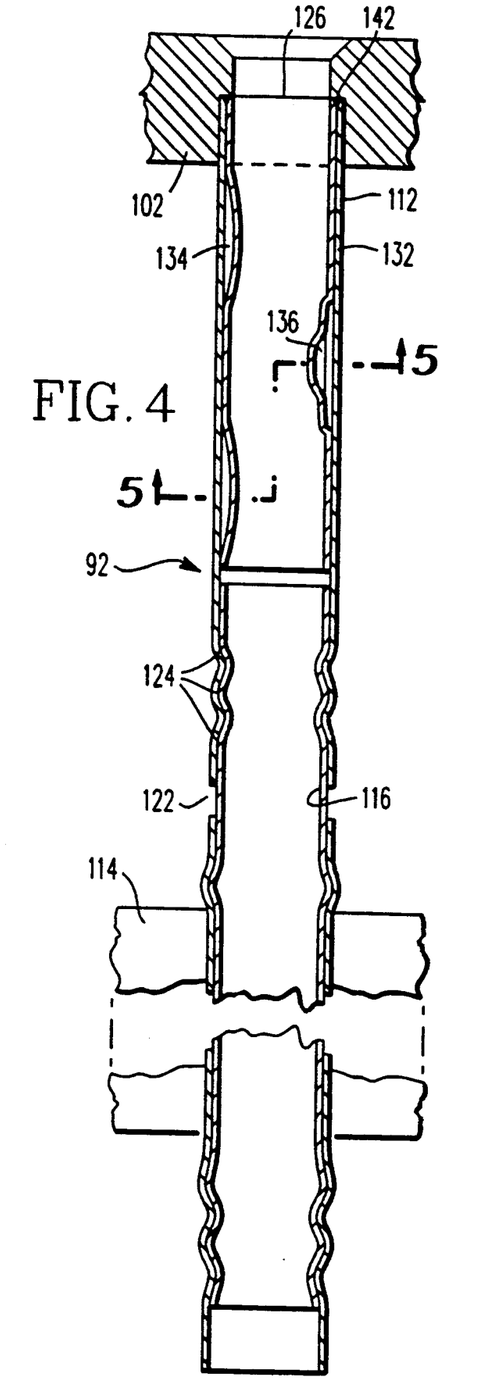
FIG. 4 is a partial section view corresponding to FIG. 3, and showing an instrumentation tube mounting arrangement according to the invention.

The length of inconel alloy inner tubing 132 can be one or two feet long (30 to 60 cm) and is preferably 1.0 to 1.5 feet (30 to 45 cm) in length. At alternating diametrically opposite positions along the inconel insert tube, dimples 134 and springs 136 are respectively formed, in alternating manner on opposite sides of the inconel tube 132. The springs and dimples reduce the inner diameter of the thimble tube 92 adjacent the top 126, and minimize vibration of the sensor tube 66 by holding the sensor tube resiliently in place and protected from impact against the inner walls of the thimble tube.

The dimples 134 are formed as simple radially inward depressions, for example of 0.1 to 0.3 inches depth (0.25 to 0.75 cm). The dimples 134 extend axially about 0.3 inch (0.75 cm), and can be provided, for example, at intervals of one to three inches (2.5 to 8 cm).

The springs 136 each are formed by two axial slits 138, with the web 140 between the slits 138 deformed radially inwardly to define a spring bow which is attached integrally to the tube section 132 at the ends of the slits 138. The slits 138 can be, for example, about 0.5inches long, and about 0.2 inches in width (1.2×0.5 cm). These dimensions can be varied as needed to provide a softer hold, e.g., by using axially longer and/or more closely spaced slits, or a stronger hold.

The inconel spring/dimple tube section 132 in the embodiment shown is not axially fixed to the stainless steel outer tube 112 by complementary annular bulges, as is the zirconium alloy tube farther down. It is possible to form a similar bulge arrangement for axially fixing the inconel tube. Preferably, however, the inconel tube is rigidly attached at spot welds 142 to the stainless steel tube 112 at the top edges of the instrumentation thimble 92.

Figure 5:
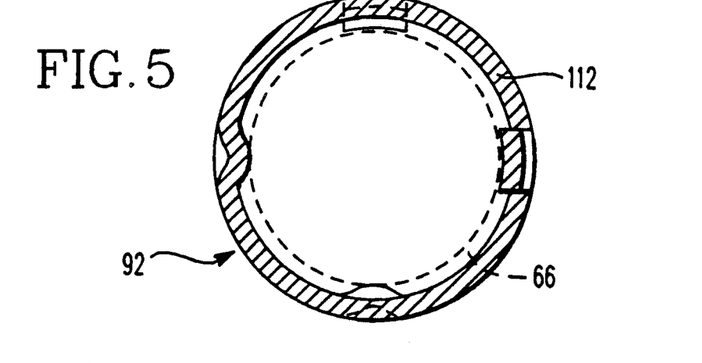
FIG. 5 is a section view taken along lines 5—5 in FIG. 4.
Figure 6:
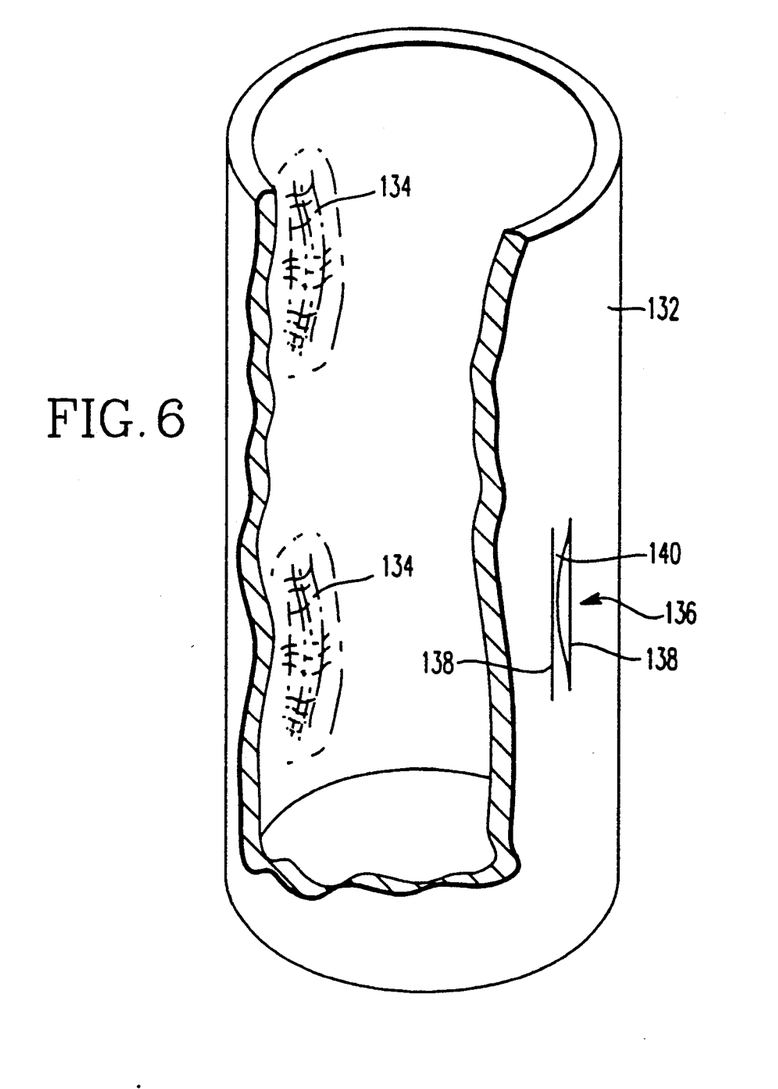
FIG. 6 is a cutaway perspective view of the instrumentation tube thimble insert of the invention, showing the opposed springs and dimples for restraining a sensor tube to be placed therein.
Figure 7:
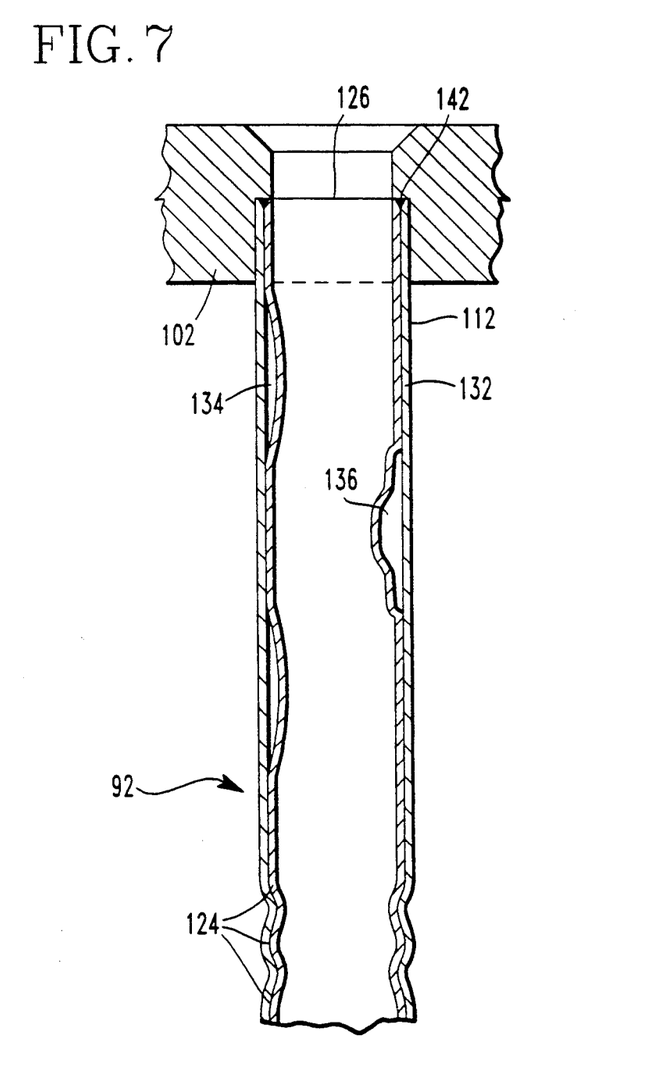
FIG. 7 is a partial section view illustrating an alternative instrumentation tube thimble arrangement.

The springs 136 and dimples 134 preferably are provided at four locations around the tube, as shown in the cross sectional view of FIG. 5. It is also possible to use one set of diametrically opposite springs and dimples, as in the cut away perspective view of FIG. 6, or to use springs and dimples at angles other than the perpendicular axes of FIG. 5. For example, springs 136 and dimples 134 can be provided at 120° intervals instead of the 90° intervals shown in FIG. 5. Also, as shown in FIG. 7, the insert tube can be attached to the thimble by either or both of weld 142 and complementary bulges 124.

The dimp positively position the sensor tube at a particular radial space from the inner wall of the instrumentation thimble tube 92. The springs 136 operate to keep the sensor tube against the dimples 134, and preferably are sufficiently tight to prevent vibration of the inserted sensor tube or housing 66 relative to the instrument tube thimble 92.

The invention having been disclosed in connection with a preferred exemplary embodiment, variations within the scope of the invention will now be apparent to persons skilled in the art. Reference should be made to the appended claims rather than the foregoing discussion of preferred examples, in order to assess the scope of exclusive rights in the invention claimed.

We claim:

1. A mounting arrangement for a nuclear fuel assembly having an instrumentation tube thimble disposed in the nuclear fuel assembly for receiving at least one sensor structure, the mounting arrangement comprising:

an insert tube disposed within the instrumentation tube thimble, the insert tube having a plurality of radially inward resilient protrusions spaced axially along the insert tube on opposite inner walls of the insert tube, operable to bear resiliently inward against the sensor structure, whereby the sensor structure is restrained against lateral displacement relative to the instrumentation tube thimble in an area of the resilient protrusions.

2. The mounting arrangement according to claim 1, further comprising means for rigidly affixing the insert tube in the instrumentation tube thimble.

3. The mounting arrangement according to claim 2, wherein the means for rigidly affixing the insert tube in the instrumentation tube thimble comprises at least one of a weld bridging between an end of the insert tube and the instrumentation tube thimble, and complementary diameter variations formed respectively in the instrumentation tube thimble and in the insert tube for locking the insert tube axially in the instrumentation tube thimble.

4. The mounting arrangement according to claim 3, wherein the diameter variations comprise a plurality of axially spaced complementary bulges int he insert tube and the instrumentation tube thimble.

5. The mounting arrangement according to claim 1, wherein the resilient protrusions are defined by opposed springs and dimples on opposite inner walls of the insert tube.

6. The mounting arrangement according to claim 5, wherein the dimples are formed as indentations raised in a wall of the insert tube and the springs are formed by spaced cuts in the insert tube, a web of the insert tube between said cuts in each case being bowed radially inwardly for forming the spring.

7. The mounting arrangement according to claim 6, wherein the cuts are axially elongated along the insert tube.

8. The mounting arrangement according to claim 7, wherein the insert tube is formed of a material which has a low irradiation induced relaxation characteristic.

9. The mounting arrangement according to claim 8, wherein the insert tube is formed of an inconel alloy.

10. The mounting arrangement according to claim 9, wherein the instrumentation tube comprises a stainless steel outer sleeve and a zirconium alloy inner sleeve, and wherein the insert tube is provided in place of the zirconium alloy inner sleeve adjacent a top end of the instrumentation tube thimble.

11. A nuclear fuel assembly for use in a pressurized water nuclear reactor, comprising:

a top nozzle, a bottom nozzle, intermediate grids between the top nozzle and the bottom nozzle for receiving nuclear fuel rods, and a plurality of thimble tubes extending between the top nozzle and bottom nozzle and being fixed to the top nozzle, the bottom nozzle and the grids, the thimble tubes including guide tubes for control rods and at least one instrumentation tube thimble for receiving a sensor to be coupled to a signal processing means disposed above the mounting arrangement;

an insert tube mounted within the instrumentation tube thimble and extending for at least a portion of a length of the instrumentation tube thimble adjacent a top thereof, the insert tube having radially inward resilient protrusions and radially inward bearing springs on inner walls of the insert tube, operable to bear against a sensor structure inserted in the instrumentation tube thimble, whereby the sensor structure is restrained against lateral displacement relative to the instrumentation tube thimble.

12. The fuel assembly according to claim 11, wherein the instrumentation tube thimble comprises a stainless steel outer sleeve and a zirconium alloy inner sleeve, said inner sleeve extending downwardly from a top which is spaced from the top of the instrumentation tube thimble, the insert tube being mounted between said top of the inner sleeve and the top of the instrumentation tube thimble, axially adjacent the inner sleeve.

13. The fuel assembly according to claim 12, wherein at least one of the insert tube and the inner sleeve is fixed in the outer sleeve by at least one of welding and formation of complementary diameter variations.

14. The fuel assembly according to claim 13, wherein the inner sleeve is fixed in the outer sleeve by diameter variations comprising a plurality of axially spaced complementary bulges, and the insert tube is welded to the outer sleeve.

15. The fuel assembly according to claim 11, further comprising dimples opposed tot he sprigs, the dimples being formed as indentations in the insert tube and at least one of the springs being formed by spaced cuts int he insert tube, a web of the insert tube between said cuts being bowed radially inwardly for forming said spring.

16. The fuel assembly according to claim 15, wherein the cuts are axially elongated along the insert tube.

17. The mounting arrangement according to claim 16, wherein the insert tube is formed of a material which has a low irradiation induced relaxation characteristic.

18. The fuel assembly according to claim 17, wherein the insert tube comprises an inconel alloy.

* * * * *